United States Patent [19]

Viaud

[11] Patent Number: 5,038,002
[45] Date of Patent: Aug. 6, 1991

[54] CABLE WHICH IS EASILY STRIPPABLE BY A TRANSVERSELY-ACTING PINCER, AND CABLE-STRIPPING PINCER

[75] Inventor: André Viaud, Crosne, France

[73] Assignee: Filotex, Draveil, France

[21] Appl. No.: 502,003

[22] Filed: Mar. 28, 1990

[30] Foreign Application Priority Data

Mar. 29, 1989 [FR] France ................ 89 04073

[51] Int. Cl.$^5$ .............................................. H01B 7/00
[52] U.S. Cl. ...................................... 174/115; 174/10; 174/117 R; 174/119 R
[58] Field of Search ...................... 174/115, 117 R, 10, 174/119 R

[56] References Cited

U.S. PATENT DOCUMENTS

| 185,856 | 8/1959 | Scofield | 174/117 R |
| 186,072 | 9/1959 | Scofield | 174/117 R |
| 2,743,632 | 5/1956 | Ames | 81/9.51 |
| 3,023,267 | 2/1962 | Rubinstein et al. | 174/117 R |
| 3,033,916 | 5/1962 | Scofield | 174/117 R |
| 4,041,237 | 8/1977 | Stine et al. | 174/115 |
| 4,374,299 | 2/1983 | Kincaid | 174/115 |

FOREIGN PATENT DOCUMENTS 1459288 10/1966 France .

Primary Examiner—Morris H. Nimmo
Attorney, Agent, or Firm—Sughrue, Mion, Zinn, Macpeak & Seas

[57] ABSTRACT

A cable which is easily strippable by a transversely-acting pincer. Its sheath has a cross-section including at least two pairs of ribs delimiting longitudinal grooves which face one another in planes intersecting the inside surface of the sheath, but outside the conductors and the earthing leads of the cable.

5 Claims, 1 Drawing Sheet

CABLE WHICH IS EASILY STRIPPABLE BY A TRANSVERSELY-ACTING PINCER, AND CABLE-STRIPPING PINCER

The present invention relates to a cable which is easily strippable by a transversely-acting pincer, and to a pincer specially adapted to stripping the cable.

BACKGROUND OF THE INVENTION

With certain types of cable, in particular those used for linear networks having lateral, subscriber-serving branches for signaling, surveillance, data transmission, security, etc., purposes, it is necessary to be able to modify connections frequently, either by displacing them, or else by adding new subscribers. The stripping of conventional cables using ordinary tools at arbitrary points along ordinary cable nearly always damages the conductors. Such damage gives rise to disturbance on the installed network.

The object of the present invention is to provide a cable which is easily strippable, minimizing the risk of damaging or cutting conductors therein, and making it possible to modify or add connections quickly. Another object of the invention is to provide a tool, in particular a pincer, which further increases security when stripping such a cable.

SUMMARY OF THE INVENTION

In a cable of the invention, the sheath has a cross-section including at least two pairs of ribs delimiting longitudinal grooves which face one another in planes intersecting the inside surface of the sheath, but outside the conductors and the earthing leads of the cable.

It preferably satisfies at least one of the following characteristics:

the cross-section of the sheath includes two pairs of ribs and of longitudinal grooves in parallel planes on either side of the cable axis;

the cross-section of the sheath together with its ribs can be inscribed in a square;

its earthing leads are constituted either by one or more bare multistrand or single strand conductors assembled simultaneously with the signal-carrying conductors, or else by flat strips disposed in such a manner as to avoid being intersected by the planes of the pairs of longitudinal grooves, or else by both types of earthing lead simultaneously; and the planes of the pairs of longitudinal grooves also intersect the screening of the cable.

The stripping pincer of the invention includes an abutment between its jaws for limiting the depth to which the cable penetrates between the jaws. Its jaws are preferably controlled by a system of toggle-action arms.

BRIEF DESCRIPTION OF THE DRAWING

An embodiment of the invention is described by way of example with reference to the accompanying drawing, in which.

DETAILED DESCRIPTION

Figure 1:
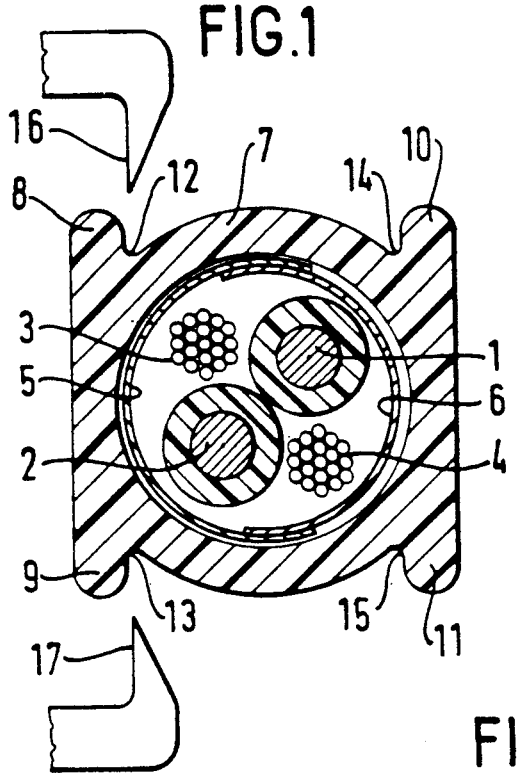
FIG. 1 is a cross-section through a screened cable having stranded earthing leads.

In FIG. 1, the cable comprises two insulated conductors 1 and 2, two earthing or grounding conductors 3 and 4, two screening tapes 5 and 6, and a sheath 7. The sheath has two pairs of longitudinal ribs 8 & 9 and 10 & 11 delimiting grooves 12 & 13 and 14 & 15 for engaging the jaws 16 and 17 of a stripping pincer. The planes of the grooves intersect the inside surface of the sheath and the screening.

Figure 2:
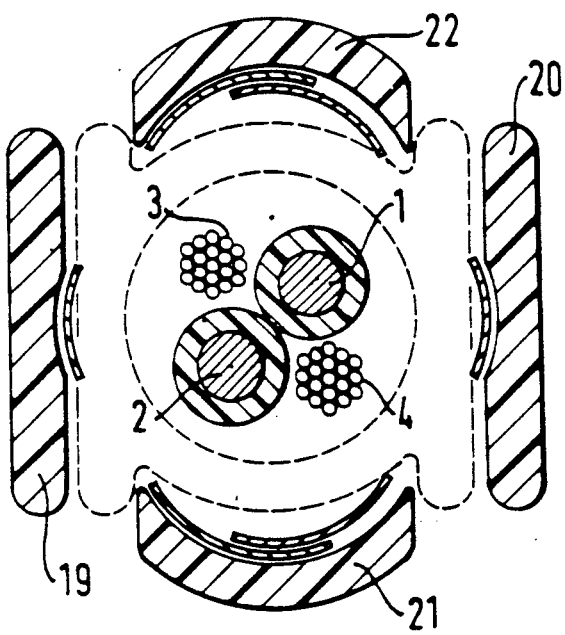
FIG. 2 is a cross-section through the cable after the stripping operation.

After both sides of the cable have been stripped, there remain only the conductors and the earthing leads of the cable, as shown in FIG. 2, with the sheath and the screening being split into four elements 19, 20, 21, and 22.

Figure 3:
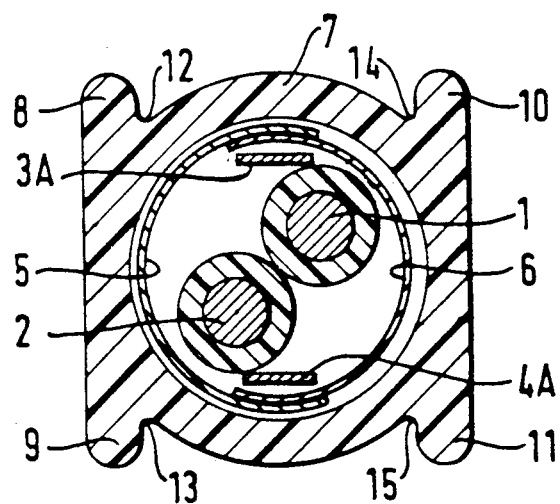
FIG. 3 is a cross-section through a cable having earthing leads constituted by flat strips disposed outside the range of the cutting planes of the jaws of a pincer.

In FIG. 3, the earthing leads 3A and 4A of the cable are in the form of flat strips which are disposed between the cutting planes (or more exactly the cutting cylinders) of a stripping pincer as defined by the grooves, thereby ensuring that there is no danger of them being damaged during stripping.

Figure 4:
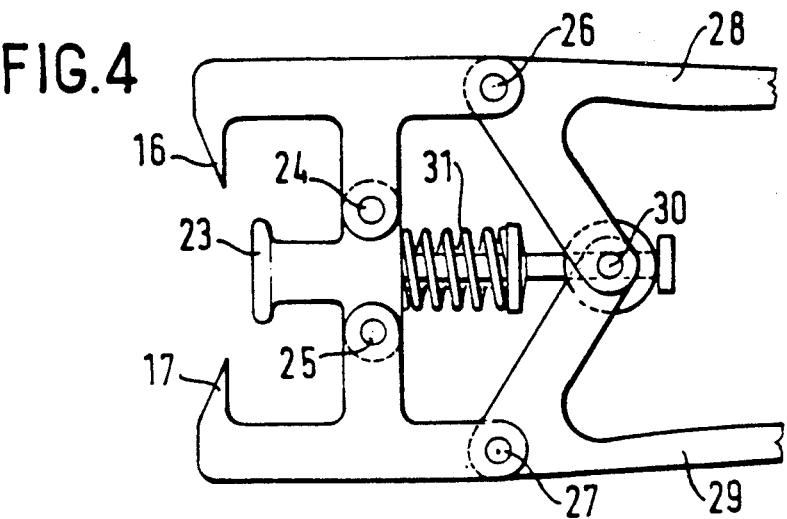
FIG. 4 is an elevation view of a stripping pincer controlled by a toggle mechanism and having an abutment for limiting the depth to which the cable penetrates into the pincer.

The stripping pincer shown in FIG. 4 includes an abutment 23 between its jaws 16 and 17 for limiting cable penetration between the jaws, thereby ensuring that only the sheath and possible the screening is concerned by the cutting action of the pincer.

The position of the abutment is naturally fixed as a function of the thickness of the sheath and also possibly of the screening of the cable to be stripped. The jaws 16 and 17 pivot about fixed axes 24 and 25. They are connected via moving pins 26 and 27 to control arms 28 and 29 pivoting about a toggle axis 30 offset behind the rear end of a spring 31 by sufficient clearance to allow the abutment to move rearwards under stripping forces.

I claim:

1. A cable which is easily strippable by a transversely-acting pincer, said cable comprising: a sheath (7) having internally thereof conductors and earthing leads, said sheath totally surrounding said conductors and earthing leads and having a cross-section including at least one pair of ribs (8, 9, 10, 11) delimiting longitudinal grooves (12, 13, 14, 15) which face one another in planes intersecting the inside surface of the sheath, but outside the conductors (1,2) and earthing leads (3, 4; 3A, 4A) of the cable.

2. A cable according to claim 1, wherein the sheath (7) includes two pairs of rigs (8, 9, 10, 11) and two pairs of longitudinal grooves (12, 13, 14, 15) in parallel planes on opposite sides of the cable axis.

3. A cable according to claim 2, wherein the cross-section of the sheath together with its ribs can be inscribed in a square.

4. A cable according to claim 1, wherein said earthing leads are constituted by at least one bare conductor having at least one strand and assembled simultaneously with signal-carrying conductors and disposed in such a manner as to avoid being intersected by the plane of said pair of longitudinal grooves.

5. A cable according to claim 1, wherein the cable includes screening, and wherein the planes of the pair of longitudinal grooves also intersect the screening (5, 6) of the cable.

* * * * *